(12) United States Patent
Son et al.

(10) Patent No.: US 9,260,575 B2
(45) Date of Patent: Feb. 16, 2016

(54) FILM AND METHOD OF PREPARING THE SAME

(75) Inventors: Jin Ryul Son, Incheon (KR); Sung Hwan Bang, Incheon (KR); Jyung Hee Jeon, Incheon (KR); Sang Youb Lee, Incheon (KR); Ju Hee Shin, Incheon (KR)

(73) Assignee: SAMSUNG FINE CHEMICALS CO., LTD. (KR)

( * ) Notice: Subject to any disclaimer, the term of this patent is extended or adjusted under 35 U.S.C. 154(b) by 0 days.

(21) Appl. No.: 13/581,719

(22) PCT Filed: Aug. 3, 2012

(86) PCT No.: PCT/KR2012/006181
§ 371 (c)(1),
(2), (4) Date: Aug. 29, 2012

(87) PCT Pub. No.: WO2013/157702
PCT Pub. Date: Oct. 24, 2013

(65) Prior Publication Data
US 2015/0027343 A1    Jan. 29, 2015

(30) Foreign Application Priority Data

Apr. 18, 2012   (KR) .................. 10-2012-0040422

(51) Int. Cl.
| | | |
|---|---|---|
| *C09D 101/26* | (2006.01) | |
| *C08J 5/18* | (2006.01) | |
| *B29D 7/01* | (2006.01) | |
| *C08K 3/16* | (2006.01) | |
| *C08L 1/28* | (2006.01) | |
| *B05D 1/18* | (2006.01) | |
| *B05D 3/00* | (2006.01) | |
| *C08J 3/28* | (2006.01) | |
| *B29C 41/24* | (2006.01) | |
| *C08L 1/26* | (2006.01) | |
| *B29K 1/00* | (2006.01) | |

(52) U.S. Cl.
CPC ... *C08J 5/18* (2013.01); *B05D 1/18* (2013.01); *B05D 3/007* (2013.01); *B29C 41/24* (2013.01); *B29D 7/01* (2013.01); *C08J 3/28* (2013.01); *C08K 3/16* (2013.01); *C08L 1/26* (2013.01); *C08L 1/284* (2013.01); *B29K 2001/08* (2013.01); *C08J 2301/28* (2013.01)

(58) Field of Classification Search
None
See application file for complete search history.

(56) References Cited

U.S. PATENT DOCUMENTS

| 4,993,137 | A | 2/1991 | Muto et al. | |
|---|---|---|---|---|
| 6,294,008 | B1 * | 9/2001 | Keary et al. ................. | 106/172.1 |
| 2002/0048601 | A1 * | 4/2002 | Beckett ..................... | A61K 9/02 |
| | | | | 424/486 |
| 2007/0104965 | A1 * | 5/2007 | Labrousse ......... | B32B 17/10036 |
| | | | | 428/432 |
| 2007/0207108 | A1 * | 9/2007 | Yamasaki ............. | A23L 1/3084 |
| | | | | 424/70.13 |

FOREIGN PATENT DOCUMENTS

| EP | 1045000 | A1 | 10/2000 |
|---|---|---|---|
| EP | 1045000 | B1 | 1/2003 |
| EP | 1502588 | A1 | 2/2005 |
| EP | 1547583 | A2 | 6/2005 |
| EP | 1547583 | A3 | 11/2005 |
| EP | 1591106 | A1 | 11/2005 |
| EP | 1547583 | B1 | 6/2008 |
| EP | 1502588 | B1 | 3/2013 |
| JP | EP1502588 | * | 9/2003 |
| WO | WO0063254 | * | 10/2000 |

* cited by examiner

*Primary Examiner* — Melvin C Mayes
*Assistant Examiner* — Colette Nguyen
(74) *Attorney, Agent, or Firm* — Cantor Colburn LLP

(57) ABSTRACT

A film and a method of preparing the same. The film includes cellulose ether and sodium chloride, wherein an amount of the sodium chloride is from about 0.25 wt % to about 0.6 wt % based on a total weight of the film, and the film has a light-transmission reduction ratio of about 15% or less.

16 Claims, No Drawings

FILM AND METHOD OF PREPARING THE SAME

TECHNICAL FIELD

The present invention relates to a film and a method of preparing the same, and more particularly, a cellulose ether film having a low haze even with a high concentration of sodium chloride, and a method of preparing the film.

BACKGROUND ART

Cellulose ether is commonly used for commercial purposes to prepare films such as gastric hard capsules and enteric hard capsules.

The preparation of cellulose ether involves alkalizing cellulose pulp by contacting it with sodium hydroxide; etherifying the alkalized cellulose pulp using methyl chloride to form cellulose ether; washing the cellulose ether to reduce sodium chloride content in the cellulose ether; drying the washed cellulose ether to reduce water content, and pulverizing the dried cellulose ether. The sodium chloride as a product of a reaction of the sodium hydroxide used in the alkalizing of the cellulose pulp with the methyl chloride used in the etherifying the alkalized cellulose pulp and hydrochloric acid used in hydrolyzing the cellulose ether may remain in a final cellulose ether.

According to existing technologies, a film prepared using a cellulose ether solution prepared from cellulose ether with a high sodium chloride content (for example, greater than about 0.3 wt %) may undergo quality degradation due to salting out and a haze on a surface thereof when stored at a predetermined temperature and a humidity condition for a long time.

U.S. Pat. No. 6,294,008 discloses a method of washing an increased number of times in preparing cellulose ether to reduce a sodium chloride residue to about 0.3 wt % or less. However, the increased number of washings in this method may increase manufacturing costs and wastewater efflux, thereby raising environmental concerns.

DETAILED DESCRIPTION OF THE INVENTION

Technical Problem

The present invention provides a cellulose ether film that contains a high concentration of sodium chloride and has a low haze.

The present invention also provides a method of preparing a film, the method including irradiating ultrasonic waves onto a cellulose ether solution.

Technical Solution

According to an aspect of the present invention, there is provided a film including cellulose ether and sodium chloride, wherein an amount of the sodium chloride is from about 0.25 wt % to about 0.6 wt % based on a total weight of the film, and the film has a light-transmission reduction ratio of about 15% or less.

The film may have a light-transmission reduction ratio of about 2% or less.

The film may be a transparent film.

The film may have a light-transmission of about 80% or greater.

The film may be a colored film.

The film may have a water vapor transmission rate (WVTR) of about 160 g/m$^2$/day or less.

The film may be used for hard capsules, food films, medical films, or industrial films.

According to another aspect of the present invention, there is provided a method of preparing a film, the method including: dissolving cellulose ether in a solvent to obtain an untreated cellulose ether solution; ultrasonicating the untreated cellulose ether solution to obtain a treated cellulose ether solution; coating the treated cellulose ether solution on a substrate; and drying the coated cellulose ether solution.

The cellulose ether may include sodium chloride, wherein an amount of the sodium chloride may be greater than about 0.3 wt % and equal to or less than 0.6 wt % based on the total weight of the cellulose ether.

The cellulose ether may be water-soluble, and the solvent may be an aqueous solvent.

The cellulose ether may include at least one selected from the group consisting of methyl cellulose, hydroxypropylmethyl cellulose, and hydroxyethylmethyl cellulose.

The untreated cellulose ether solution may have a cellulose ether concentration of from about 5 wt % to about 25 wt %.

The ultrasonication may include irradiating ultrasonic waves having a frequency of from about 10 kHz to about 30 kHz onto the untreated cellulose ether solution at an energy of from about 80 kJ/L (per volume of the untreated cellulose ether solution) to about 300 kJ/L (per volume of the untreated cellulose ether solution).

The method may further include adding a plasticizer into the untreated cellulose ether solution.

The plasticizer may include at least one selected from the group consisting of glycerol, sorbitol, propylene glycol, and polyethylene glycol.

An amount of the plasticizer may be from 1 part by weight to 10 parts by weight based on 100 parts by weight of the cellulose ether.

Advantageous Effects

As described above, according to the one or more embodiments of the present invention, a film may have reduced salting-out, a low haze, and a low WVTR. Thus, in preparing the cellulose ether film, there is no need to increase the number of washings in order to obtain cellulose ether with less sodium chloride, which is an advantage in view of economical and environmental aspects.

Best Mode

As used herein, the term "and/or" includes any and all combinations of one or more of the associated listed items. Expressions such as "at least one of," when preceding a list of elements, modify the entire list of elements and do not modify the individual elements of the list.

Hereinafter, films and methods of preparing the same according to embodiments of the present disclosure are described in greater detail.

According to an embodiment of the present disclosure, a film includes cellulose ether and sodium chloride, wherein an amount of the sodium chloride is from about 0.25 wt % to about 0.6 wt % based on a total weight of the film, and the film has a light-transmission reduction ratio of about 15% or less.

The amount of the sodium chloride may be from about 0.27 wt % to about 0.6 wt %, and in some embodiments, may be from about 0.29 wt % to about 0.6 wt %, and in some other embodiments, may be from about 0.30 wt % to about 0.6 wt %, and in still other embodiments, may be from about 0.31 wt % to about 0.6 wt %, each based on the total weight of the film.

As used herein, the term "light transmission" refers to a light transmission of the film measured by irradiating a light having a wavelength of 420 nm onto the film using a UV spectrophotometer. The term "light-transmission reduction ratio" refers to a result of subtracting a light transmission at t=4 weeks from a light transmission at t=0 week. That is, the higher the light transmission of the film, the lower the haze of the film. The lower the light transmission of the film, the higher the haze of the film. The lower the light-transmission reduction ratio of the film, the smaller the change in the haze with time.

The film may have a light-transmission reduction ratio of about 2% or less, and in some embodiments, may have a light-transmission reduction ratio of about 1.5% or less.

The film may be a transparent film with a light transmission of from about 80% or greater to about less than 100%. In some embodiments, the transparent film may have a light transmission of from about 80% or greater to about 98% or less.

The film may be a colored film containing, for example, titanium dioxide, a pigment, and the like. As used herein, the term "colored film" refers to any film excluding a transparent film, and may be, for example, a semitransparent film, an opaque film, or the like.

The film may have a water vapor transmission rate (WVTR) of about 160 $g/m^2/day$ or less, for example, a WVTR of about 155 $g/m^2/day$ or less. As used herein, the term "water vapor transmission rate (WVRT)" refers to a value measured using Water method at 25° C. and 5% relative humidity (RH). The Water method will be described later.

The film may be a hard capsule, a film for food, a film for medical/pharmaceutical use, or a film for industrial use. The hard capsule may have an enteric property.

Hereinafter, a method of preparing the film, according to an embodiment of the present disclosure, will be described in more detail.

In a first operation, cellulose ether is dissolved in a solvent to obtain an untreated cellulose ether solution. As used herein, the terms "untreated cellulose ether solution" refer to a cellulose ether solution before ultrasonication.

The cellulose ether may include sodium chloride in a range of greater than about 0.3 wt % to about 0.6 wt % or less. If the amount of the sodium chloride is within this range, the number of washings in preparing cellulose ether may be reduced to about 1 to 2 times. This may lead to lower production costs of cellulose ether, reduced generation of waste water, and thus, less environmental contamination. Using the cellulose ether solution including cellulose ether, a film with no or less salting-out may be obtained. As used herein, the expression "salting out" means the escape of sodium ions from the film.

The cellulose ether solution may be an aqueous solution. For the aqueous cellulose ether solution, the cellulose ether may be water-soluble, and the solvent may be an aqueous solvent. As used herein, the terms "aqueous solvent" means a solvent that is miscible with water and is able to dissolve the water-soluble cellulose ether.

The water-soluble cellulose ether may include at least one selected from the group consisting of methylcellulose, hydroxypropylmethylcellulose, and hydroxyethylmethylcellulose.

The aqueous solvent may include water.

A concentration of the cellulose ether in the untreated cellulose ether solution may be from about 5 to about 25 wt %. If the concentration of the cellulose ether is within this range, the untreated cellulose ether solution may have an appropriate viscosity for efficient ultrasonication.

In a second operation, the untreated cellulose ether solution is ultrasonicated to obtain a treated cellulose ether solution. This ultrasonication may prevent or reduce salting out from the film after the formation of the film is completed.

The ultrasonication may be performed by irradiating ultrasonic waves having a frequency of from about 10~30 kHz onto the untreated cellulose ether solution at an energy of about 80~300 kJ/L (volume of the untreated cellulose ether solution). If the frequency and the total irradiated energy of the ultrasonic waves are within these ranges, a film with no or reduced salting-out may be manufactured at a high processing efficiency (i.e., within an appropriate cost range of ultrasonication).

The treated cellulose ether solution may have high homogeneity due to the ultrasonication.

In a third operation, the treated cellulose ether solution is coated on a substrate.

In a fourth operation, the coated cellulose ether solution is dried (i.e., the solvent is removed from the coated cellulose ether solution).

The third and fourth operations may be performed by any method known in the art. For example, if the film is a hard capsule, a predetermined amount of the cellulose ether solution may be coated on a metal mould pin by dipping the metal mould pin in the cellulose ether solution, drawing the metal mould pin out of the cellulose ether solution, and drying the coated solution on the surface of the metal mould pin. If the film is a film for food, a film for medical/pharmaceutical use, or a film for industrial use, the film may be prepared by coating the cellulose ether solution on a glass substrate or the like, and drying the same.

The method of preparing the film may further include adding a plasticizer to the untreated cellulose ether solution. The addition of the plasticizer may further improve the effect of preventing or reducing salting out from the film.

The adding of the plasticizer may be performed before or after the ultrasonication operation.

The plasticizer may include at least one selected from the group consisting of glycerol, sorbitol, propylene glycol, and polyethylene glycol.

An amount of the plasticizer may be from about 1 to 10 parts by weight based on 100 parts by weight of the cellulose ether. If the amount of the plasticizer is within this range, the drying may be facilitated in preparing the film, along with the further improved effect of preventing or reducing salting out from the film.

Hereinafter, one or more embodiments of the present invention will be described in more detail with reference to the following examples. However, these examples are not intended to limit the scope of the present invention.

EXAMPLES

Examples 1-8, and Comparative Examples 1 to 3

Type of Cellulose Ether

Hydroxypropylmethyl cellulose (HPMC) (Samsung Fine Chemicals, BN4) was used as cellulose ether. The HPMC contained 1.5 wt % of sodium chloride.

Content Adjustment of Sodium Chloride in Cellulose Ether

The HPMC was washed with water to adjust the sodium chloride content of the HPMC. In particular, the amount of water and the number of washings vary to adjust the sodium chloride content of the HPMC. After the washing, the sodium chloride content of the HPMC was measured using a potential difference analyzer (available from Mettler-Toledo International, DL-50). The results are shown in Table 1.

Preparation of Untreated Cellulose Ether Solution

The sodium chloride content-adjusted HPMC was dissolved in water to prepare a 15 wt % aqueous HPMC solution. A predetermined amount of a plasticizer as shown in Table 1 was added into the aqueous HPMC solution to prepare an untreated HPMC solution.

Preparation of Cellulose Ether Solution with High Homogeneity

An HPMC solution with high homogeneity was prepared by ultrasonicating the untreated HPMC solution. The ultrasonication was performed using an ultrasonicator (available from Sonics & Materials, Inc., VCX-750). A container filled with the untreated HPMC solution was placed in the ultrasonicator and irradiated with ultrasonic waves under the conditions as shown in Table 1.

TABLE 1

| | Plasticizer (parts by weight*[1]) | | Ultrasonication conditions (Frequency, | Sodium chloride |
|---|---|---|---|---|
| | Glycerol | Sorbitol | Total irradiation energy level) | content (wt %) |
| Example 1 | 2 | 0 | 20 kHz, 105 kJ/0.5 L (volume of the untreated HPMC solution) | 0.31 |
| Example 2 | 2 | 0 | 20 kHz, 105 kJ/0.5 L (volume of the untreated HPMC solution) | 0.50 |
| Example 3 | 2 | 0 | 20 kHz, 105 kJ/0.5 L (volume of the untreated HPMC solution) | 0.60 |
| Example 4 | 5 | 0 | 20 kHz, 105 kJ/0.5 L (volume of the untreated HPMC solution) | 0.50 |
| Example 5 | 0 | 3 | 20 kHz, 105 kJ/0.5 L (volume of the untreated HPMC solution) | 0.50 |
| Example 6 | 0 | 0 | 20 kHz, 105 kJ/0.5 L (volume of the untreated HPMC solution) | 0.50 |
| Example 7 | 1 | 0 | 20 kHz, 63 kJ/0.5 L (volume of the untreated HPMC solution) | 0.50 |
| Example 8 | 2 | 0 | 20 kHz, 126 kJ/0.5 L (volume of the untreated HPMC solution) | 0.50 |
| Comparative Example 1 | 2 | 0 | — | 0.50 |
| Comparative Example 2 | 0 | 0 | — | 0.50 |
| Comparative Example 3 | 2 | 0 | — | 0.31 |

*[1]Calculated amount based on 100 parts by weight of HPMC

Preparation of Film

The HPMC solution with high homogeneity was casted on a glass substrate using a film caster (available from Samsung Fine Chemicals, Auto Film Applicator) and then dried to prepare a film having a thickness of about 0.1 mm.

Examples 9-16

A metal mould pin heated to about 80° C. was dipped in each of the high-homogeneity HPMC solutions (Solution temperature: 25° C.) prepared in Examples 1-8 to be coated with the HPMC solution. After being drawn out of the HPMC solution, the metal mould pin was maintained at a temperature of about 70° C. for about 5 minutes, and dried at about 30° C. for about 45 minutes to form a film (i.e., hard capsule).

Evaluation Examples

Evaluation Example 1

Evaluation of Salting-Out Level

The films according to Examples 1 to 8 and Comparative Examples 1 to 3 were each cut to a size of 2 cm (width)×2 cm (length) and placed in a 40 mL-vial at about 40° C. and 75% RH for 1 month. Afterward, the level of salting-out from each film was determined as one of the four grades by visual inspection with the naked eyes. The results are shown in Table 2 below.
x: none
o: slight
◎: medium
•: large Evaluation Example 2

Evaluation of Haze

A light transmission of each of the films of Examples 1-8 and Comparative Examples 1-3 was measured by irradiating 420nm-wavelength light onto each of the films using a UV spectrophotometer (JASCO, V-550). A light-transmission reduction ratio in each of the films after 4 weeks was calculated. The results are shown in Table 2 below. A higher light transmission means a lower haze.

TABLE 2

| | Level of salting-out | | Light transmission (%) | | Light-transmission reduction ratio (%)*[1] |
|---|---|---|---|---|---|
| | after 2 weeks | after 4 weeks | Initial | after 4 weeks | |
| Example 1 | x | x | 95.25 | 95.08 | 0.17 |
| Example 2 | x | x | 94.32 | 94.12 | 0.2 |

TABLE 2-continued

| | Level of salting-out | | Light transmission (%) | | |
|---|---|---|---|---|---|
| | after 2 weeks | after 4 weeks | Initial | after 4 weeks | Light-transmission reduction ratio (%)*1 |
| Example 3 | x | x | 97.2 | 96.9 | 0.3 |
| Example 4 | x | x | 95.46 | 95.16 | 0.3 |
| Example 5 | x | x | 96.33 | 95.12 | 1.21 |
| Example 6 | x | o | 94.56 | 84.7 | 9.86 |
| Example 7 | x | o | 95.37 | 81.79 | 13.58 |
| Example 8 | x | x | 96.2 | 95.67 | 0.53 |
| Comparative Example 1 | x | □ | 95.88 | 21.75 | 74.13 |
| Comparative Example 2 | □ | ● | 96.12 | 10.48 | 85.64 |
| Comparative Example 3 | x | o | 94.92 | 73.12 | 21.8 |

*1Light transmission reduction ratio (%) = (Initial light transmission − Light transmission after 4 weeks) (%)

Referring to Table 2, the films of Examples 1-8 were found to have lower salting-out levels and higher light transmissions (lower hazes) than those of the films of Comparative Examples 1-3. With the addition of the plasticizer, the light transmission of the films of Examples 1-8 was further higher (i.e., further lower haze) than those of the films of Comparative Examples 1-3.

Evaluation Example 3

Evaluation of WVTR

After the films of Example 2 and Comparative Example 2 were each cut to a size of 8 cm (width)×8 cm (length), a water vapor transmission rate (WVRT) of each of the films was measured at about 25□ and 5% RH using Water method. The results are shown in FIG. 3. According to the Water method, a cup filled with a predetermined amount of water was tightly covered with the film, and then left at a predetermined temperature and humidity for 24 hours, followed by calculating an amount of evaporated water as WVRT.

TABLE 3

| | Example 2 | Comparative Example 2 |
|---|---|---|
| WVTR (g/m²/day) | 153.33 | 166.67 |

Referring to Table 3, the film of Example 2 was found to have a lower WVTR than the film of Comparative Example 2.

The invention claimed is:

1. A film comprising cellulose ether and sodium chloride, wherein an amount of the sodium chloride is from about 0.25 wt % to about 0.6 wt % based on a total weight of the film, and the film has a light-transmission reduction ratio of about 15% or less.

2. The film of claim 1, wherein the film has a light-transmission reduction ratio of about 2% or less.

3. The film of claim 1, wherein the film is a transparent film.

4. The film of claim 3, wherein the film has a light-transmission of about 80% or greater.

5. The film of claim 1, wherein the film is a colored film.

6. The film of claim 1, wherein the film has a water vapor transmission rate (WVTR) of about 160 g/m²/day or less.

7. The film of claim 1, wherein the film is used for hard capsules, food films, medical films, or industrial films.

8. A method of preparing the film of claim 1, the method comprising: dissolving cellulose ether in a solvent to obtain an untreated cellulose ether solution; ultrasonicating the untreated cellulose ether solution to obtain a treated cellulose ether solution; coating the treated cellulose ether solution on a substrate; and drying the coated cellulose ether solution.

9. The method of claim 8, wherein the cellulose ether comprises sodium chloride, wherein an amount of the sodium chloride is greater than about 0.3 wt % and equal to or less than 0.6 wt % based on the total weight of the cellulose ether.

10. The method of claim 8, wherein the cellulose ether is water-soluble, and the solvent is an aqueous solvent.

11. The method of claim 8, wherein the cellulose ether comprises at least one selected from the group consisting of methyl cellulose, hydroxypropylmethyl cellulose, and hydroxyethylmethyl cellulose.

12. The method of claim 8, wherein the untreated cellulose ether solution has a cellulose ether concentration of from about 5 wt % to about 25 wt %.

13. The method of claim 8, wherein the ultrasonication comprises irradiating ultrasonic waves having a frequency of from about 10 kHz to about 30 kHz onto the untreated cellulose ether solution at an energy of from about 80 kJ/L (per volume of the untreated cellulose ether solution) to about 300 kJ/L (per volume of the untreated cellulose ether solution).

14. The method of claim 8, further comprising adding a plasticizer into the untreated cellulose ether solution.

15. The method of claim 14, wherein the plasticizer comprises at least one selected from the group consisting of glycerol, sorbitol, propylene glycol, and polyethylene glycol.

16. The method of claim 14, wherein an amount of the plasticizer is from 1 part by weight to 10 parts by weight based on 100 parts by weight of the cellulose ether.

* * * * *